(12) United States Patent
Elija et al.

(10) Patent No.: US 10,994,685 B2
(45) Date of Patent: May 4, 2021

(54) KNEE AIR BAG MODULE

(71) Applicant: TRW AUTOMOTIVE GMBH, Alfdorf (DE)

(72) Inventors: Daniel Elija, Schwäbisch Gmümd (DE); Werner Freisler, Heubach (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 213 days.

(21) Appl. No.: 16/073,404

(22) PCT Filed: Feb. 7, 2017

(86) PCT No.: PCT/EP2017/052618
§ 371 (c)(1),
(2) Date: Jul. 27, 2018

(87) PCT Pub. No.: WO2017/137387
PCT Pub. Date: Aug. 17, 2017

(65) Prior Publication Data
US 2019/0031131 A1 Jan. 31, 2019

(30) Foreign Application Priority Data
Feb. 9, 2016 (DE) .................... 10 2016 001 457.1

(51) Int. Cl.
*B60R 21/206* (2011.01)
*B60R 21/201* (2011.01)
(Continued)

(52) U.S. Cl.
CPC .......... *B60R 21/206* (2013.01); *B60R 21/201* (2013.01); *B60R 21/215* (2013.01);
(Continued)

(58) Field of Classification Search
CPC ... B60R 21/206; B60R 21/201; B60R 21/215; B60R 21/217; B60R 21/231; B60R 2021/161; B60R 2021/23169
(Continued)

(56) References Cited

U.S. PATENT DOCUMENTS 4,964,654 A * 10/1990 Bishop ................ B60R 21/2171
280/728.2
5,211,421 A * 5/1993 Catron ................. B60R 21/215
280/728.2
(Continued)

FOREIGN PATENT DOCUMENTS

DE 19749585 5/1999
DE 102008029810 12/2009

*Primary Examiner* — James A Shriver, II
*Assistant Examiner* — Hilary L Johns
(74) *Attorney, Agent, or Firm* — Tarolli, Sundheim, Covell & Tummino LLP

(57) ABSTRACT

A knee airbag module of a vehicle occupant restraint system comprises an outer housing (12) having a front side (14) including a deployment aperture (18) as well as an opposite rear side (16), an airbag (20) and an inflator (32) which provides filling gas for the deployment of the airbag (20). The airbag (20) is folded and in the folded state is retained by a flexible airbag wrapping (34) while forming an airbag package (24), wherein the airbag package (24) constitutes a pre-assembled unit and the flexible airbag wrapping (34) closes off the knee airbag module (10) at least in portions to the outside. There is provided a rigid outer housing part (42) which includes a first bearing zone (54) positioned in the area of the airbag package (24) against which the airbag (20) bears during deployment.

29 Claims, 3 Drawing Sheets

(51) Int. Cl.
*B60R 21/217* (2011.01)
*B60R 21/215* (2011.01)
*B60R 21/231* (2011.01)
*B60R 21/16* (2006.01)

(52) U.S. Cl.
CPC .......... *B60R 21/217* (2013.01); *B60R 21/231* (2013.01); *B60R 2021/161* (2013.01); *B60R 2021/23169* (2013.01)

(58) Field of Classification Search
USPC ..................................................... 280/730.1
See application file for complete search history.

(56) References Cited

U.S. PATENT DOCUMENTS

| | | | | |
|---|---|---|---|---|
| 5,234,227 A | * | 8/1993 | Webber | ............... B60R 21/2171 |
| | | | | 280/728.1 |
| 5,613,698 A | * | 3/1997 | Patercsak | .............. B60R 21/201 |
| | | | | 280/728.1 |
| 8,746,732 B1 | * | 6/2014 | Kutchey | ............... B60R 21/206 |
| | | | | 280/728.2 |
| 2008/0100048 A1 | | 5/2008 | Freisler | |
| 2010/0314857 A1 | | 12/2010 | Rick | |
| 2016/0272142 A1 | | 9/2016 | Garret et al. | |

\* cited by examiner

KNEE AIR BAG MODULE

RELATED APPLICATIONS

This application corresponds to PCT/EP2017/052618, filed Feb. 2, 2017, which claims the benefit of German Application No. 10 2016 001 457.1, filed Feb. 9, 2016, the subject matter of which are incorporated herein by reference in their entirety.

BACKGROUND OF THE INVENTION

The invention relates to a knee airbag module of a vehicle occupant restraint system.

In the event of crash, knee airbag modules protect the vehicle occupant from impact in the leg region. Frequently, the knee airbag module is placed in a lower portion of the instrument panel or below the latter in the vehicle interior, and upon activation of the airbag module the knee airbag deploys along the instrument panel in the direction of the vehicle occupant between the instrument panel and the legs of the vehicle occupant.

Since the knee airbag module is concealed behind or below the instrument panel, it has been thought about replacing the rigid housing which is usually provided for an airbag and completely surrounds the inflator and the folded airbag package merely with a flexible wrapping. In so doing, it has turned out, however, that the deployment behavior of the airbag will change as compared to a rigid housing.

SUMMARY OF THE INVENTION

It is the object of the invention to provide a knee airbag module which both can be manufactured at low cost and is small-sized and exhibits a defined reproducible deployment and positioning behavior of the airbag.

The object is achieved by a knee airbag module of a vehicle occupant restraint system comprising an outer housing having a front side including a deployment aperture as well as an opposite rear side, an airbag and an inflator providing filling gas for deploying the airbag. The airbag is folded and maintained in the folded state by a flexible airbag wrapping while forming an airbag package. The airbag package constitutes a pre-assembled unit. The flexible airbag wrapping at least in portions closes the knee airbag module off to the outside. The outer housing comprises a rigid outer housing part including a bearing zone positioned in the area of the airbag package against which the airbag bears during deployment.

This object is equally achieved by a knee airbag module of a vehicle occupant restraint system, comprising an airbag and an inflator which provides filling gas for deployment of the airbag. The airbag is folded and is maintained in the folded state by a flexible airbag wrapping while forming an airbag package. The airbag package forms a pre-assembled unit. The flexible airbag wrapping at least in portion closes off the knee airbag module to the outside. In the mounting position of the pre-assembled unit, part of the vehicle environment forms a bearing zone positioned in the area of the airbag package against which the airbag bears during deployment.

Hence, in accordance with the invention, it is renounced to completely surround the knee airbag module with a rigid outer housing, which entails savings in material and constructing space. In portions, the outer delimitation of the knee airbag module is formed solely by the flexible airbag wrapping without the latter being enclosed by a further layer or a housing part. However, in the area of the airbag package in portions a rigid stable first bearing zone is provided which forms a counter-bearing to the forces in the initial state acting on the airbag package during deployment of the airbag and, in this way, provides a bearing zone to achieve a defined force component in the direction of the deployment aperture. Since the bearing zone is rigid, it is capable of efficiently putting a predeterminable defined counter-force against the acting forces. In other portions along the outer periphery of the airbag package where a rigid housing is not required, the latter may be omitted according to the invention so that the rigid outer housing part may constitute the only rigid portion of the outer housing.

The first bearing zone is preferably opposed to the deployment aperture. During initial deployment of the airbag a force component is formed which is directed toward the rear side of the outer housing. The first bearing zone generates a counter-force directed toward the deployment aperture so that finally a force directed toward the deployment aperture is resulting on the airbag package for pushing the remaining still folded airbag out of the outer housing.

The first bearing zone may form a portion of a rear wall of the outer housing opposed to the deployment aperture. The rigid outer housing part preferably only in portions closes off the knee airbag module to the outside in the area of the rear side of the outer housing, however, so that portions of the airbag package protrude from the rigid outer housing part. The rigid outer housing part may be a bent component part made from sheet metal, for example.

Preferably, the rigid outer housing is a separate one-piece component part. The rigid outer housing part may be attached to the outside of the flexible airbag wrapping, for example, but it may as well be disposed inside the flexible airbag wrapping. It is also imaginable that the flexible airbag wrapping is not provided in the area of the rigid outer housing part but is interrupted there in portions.

In particular, the rigid outer housing part may be L-shaped in cross-section, with a first leg of the L forming at least part of the rear side and a second leg of the L forming at least part of a sidewall of the rigid outer housing. In total, the rigid outer housing part may take an oblong shape bent in L-shape, with the two legs preferably enclosing an angle of about 90°. The opposite end faces of the rigid outer housing part are preferably open.

It is equally possible to design the outer housing part of two separate elements or to design either of the two legs by a part of the vehicle environment such as a body or lining part. Accordingly, also angles deviating from 90° are possible.

The first bearing zone extends preferably flatly so as to apply a definitely directed force perpendicularly to the deployment aperture over the entire area of the airbag package.

The lower end of the second leg in the mounting position especially forms a second bearing zone against which the airbag bears during and after its deployment so as to adopt its final position inside the vehicle. Said second bearing zone may render the use of further environmental component parts for positioning the airbag superfluous. It is possible for the airbag to contact, during its employment, merely the rigid outer housing part, especially the first and second legs thereof as well as a portion of the instrument panel, until it has adopted its final position.

It is advantageous for this purpose when the second bearing zone protrudes from the inflator in a direction perpendicularly to the first bearing zone so that sufficient counter-force is resulting for positioning the airbag along the instrument panel.

In the mounting position of the knee airbag module either of the two bearing zones or both bearing zones may as well be formed by parts of the vehicle environment such as parts of the body shell or parts of the vehicle lining.

The rigid outer housing part may constitute, for example, a maximum of 75% of the rear side of the outer housing of the knee airbag module. Of preference, the rigid outer housing part also forms a maximum of 75% of the sidewall facing away from the vehicle occupant, while the remaining part of the outer surface of the module is formed at least predominantly, preferably completely, by the flexible airbag wrapping.

On principle, the rigid outer housing part only has to form one or two sufficiently large bearing zones which reproducibly exert(s) a defined force directed into the vehicle interior on the airbag package when the knee airbag module is activated. The rigid outer housing part may be omitted at the areas of the outer housing where a bearing effect is not required.

Preferably, the airbag package includes in its folded package portion an inflating portion which deploys at the beginning of the deploying operation, with the inflating portion being arranged adjacent to the first bearing zone. During initial filling of the airbag, at first the inflating portion is filled and increases its volume, which is resulting in a force acting on the first bearing zone and a counter-force resulting from the first bearing zone toward the deployment aperture. In this way, the inflating portion can move the still partially folded airbag package into the vehicle interior where the airbag then will completely deploy.

The airbag package includes plural separately folded portions, for example, with the inflating portion constituting one of said portions. Via the folding and the arrangement of the individual airbag portions, inter alia the deployment behavior of the airbag along the instrument panel can be influenced.

The inflating portion may be formed, for example, by one single fold of the airbag. It would also be sufficient to provide only one single portion of the airbag extending in parallel to the first bearing zone as an inflating portion, wherein the filling gas flowing between the outer walls of the airbag swells the inflating portion and, in this way, generates the force required to push the remaining still folded airbag package through the deployment aperture into the vehicle interior in front of the instrument panel.

The knee airbag module preferably includes a cover facing the vehicle interior and closing the deployment aperture prior to deployment of the airbag. Said cover may be part of the outer housing, but it may as well be part of the instrument panel or part of a lining in the floor room of the vehicle.

The airbag wrapping preferably is a part having no inherent rigidity and may especially be made from a fabric material or a film.

The airbag wrapping may also wrap the inflator so that the latter, too, is part of the pre-assembled unit. In this case, the folded airbag package and the inflator may be enclosed by the flexible airbag wrapping and may subsequently be inserted into the rigid outer housing part. Of course, it is also possible to place the rigid outer housing part at first around the airbag package and then to surround the assembly consisting of the inflator, the airbag package and the rigid outer housing part with the flexible airbag wrapping. The flexible airbag wrapping is tensioned so tightly over the airbag package that it retains the latter in its folded state.

The rigid outer housing part may include a fastening portion via which the outer housing can be fixed to the vehicle. For example, the fastening portion may constitute one or more rigid tabs bent outwardly on the sheet metal bent in L-shape in each of which a fastening hole is provided, for instance, via which the rigid outer housing part may be screwed to a body member.

Alternatively or additionally, it is possible to provide fastening holes in the first or second leg of the rigid outer housing part through which the fastening bolts of the inflator normally used to fasten the knee airbag module to the vehicle are protruding. In this way, for example the rigid outer housing part can be tightly fixed along with the inflator to the vehicle. Equally, the inflator can be solely fixed on the right outer housing part, while the knee airbag module is fastened in a manner fixed to the vehicle via the tabs at the rigid outer housing part.

BRIEF DESCRIPTION OF THE DRAWINGS

Hereinafter the invention shall be described in detail by way of the enclosed drawings, wherein.

DESCRIPTION

Figure 1:
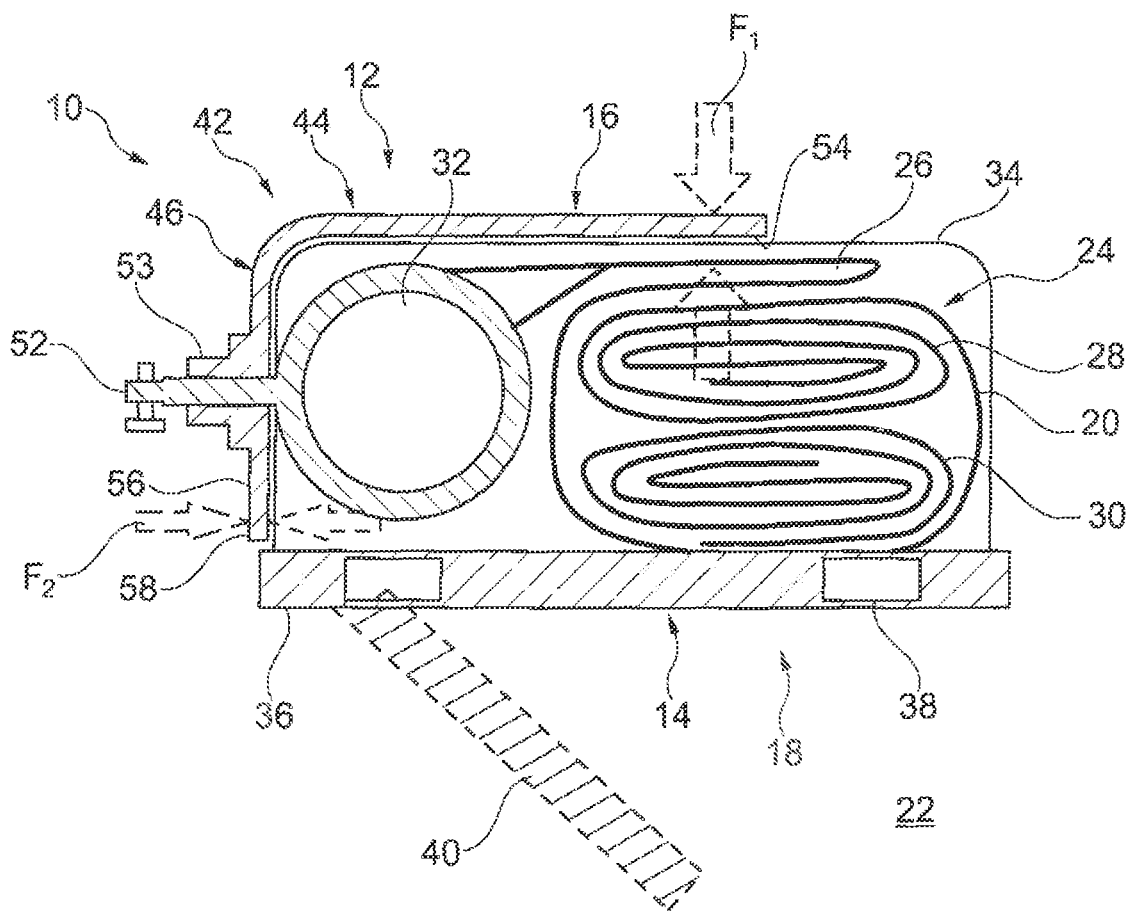
FIG. 1 shows a schematic side view of a knee airbag module according to the invention in accordance with a first embodiment.

FIG. 1 illustrates a knee airbag module 10 of a vehicle occupant restraint system not shown in detail according to a first embodiment. The knee airbag module 10 comprises an outer housing 12 including a front side 14 as well as a rear side 16 opposed thereto. In the front side 14 a deployment aperture 18 is provided which is released upon activation of the knee airbag module 10 and through which an airbag 20 accommodated inside the outer housing 12 can exit into a vehicle interior 22.

Figure 4:
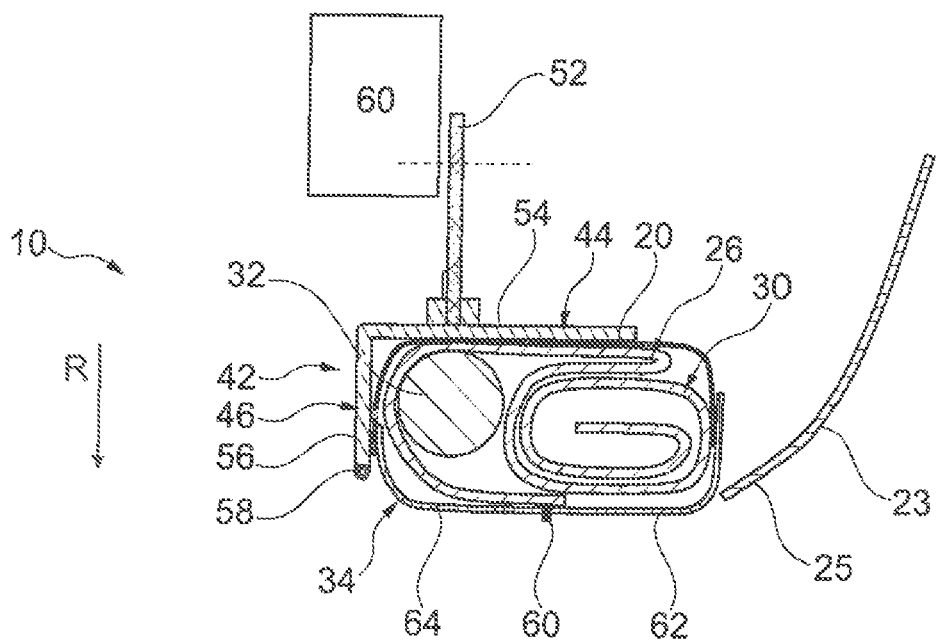
FIG. 4 shows a schematic sectional view of the knee airbag module from FIG. 3 in the non-activated state.
Figure 5:
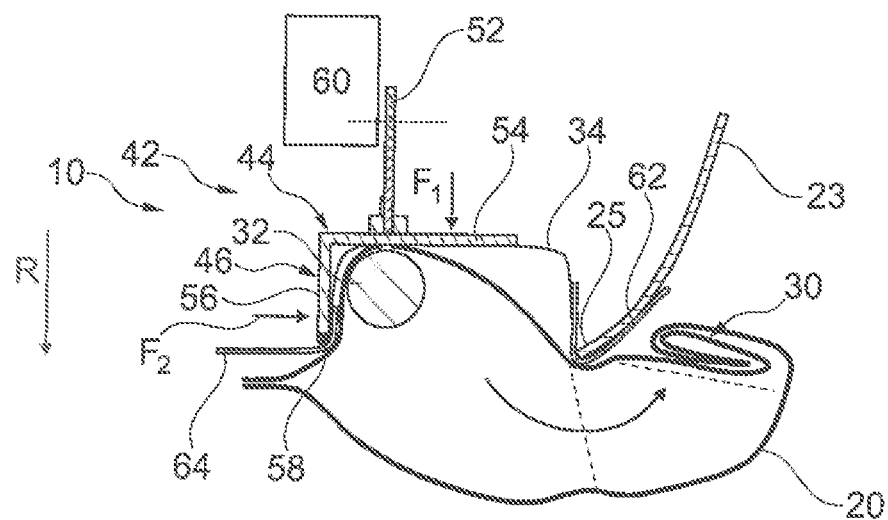
FIGS. 5 and 6 shows the knee airbag module from FIG. 3 in different deployment phases of the airbag.
Figure 6:
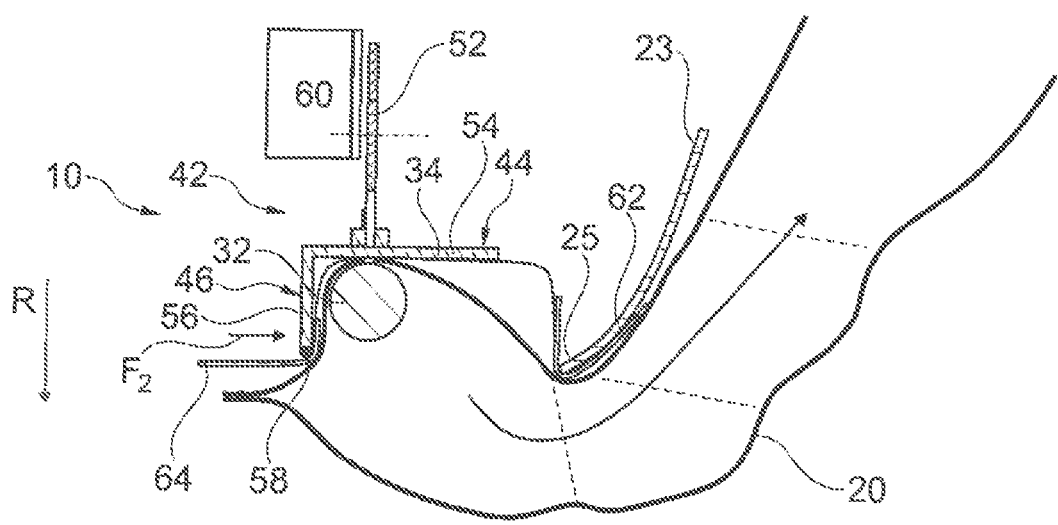

The knee airbag module 10 is arranged in the floor room of a passenger car and is arranged, for example, in a recess of the instrument panel 23 or in the floor room area adjacent to a lower end 25 of the instrument panel (cf. FIGS. 4 to 6).

Prior to its deployment, the airbag 20 is folded into an airbag package 24 which includes plural portions 26, 28, 30 separately folded in different types of folding.

The filling gas required for inflating the airbag 20 is supplied by an inflator 32 equally accommodated in the outer housing 12.

The airbag package 24 and, in this example, also the inflator 32 are surrounded by a flexible airbag wrapping 34 which is wound so tightly around the airbag package 24 that it keeps the latter together in the folded state. The flexible airbag wrapping 34 may consist, for example, of a fabric, especially coated airbag fabric or a film.

The flexible airbag wrapping 34 may completely surround the assembly consisting of the inflator 32 and the airbag package 24. The inflator 32 and the airbag package 24 in this case form a pre-assembled unit.

At its front side 14 the outer housing 12 is closed by a cover 36 covering the deployment aperture 18 prior to deployment of the airbag 20. The cover 36 is made from a rigid synthetic material, for example. In the cover 36 one or more weakened zones 38 are formed defining a flap 40 which upon activation of the knee airbag module 10 swings open into the vehicle interior 22 and in this way releases the deployment aperture 18 through which the airbag 20 may pass into the vehicle interior 22.

The cover 36 may be part of the instrument panel 23 or of the floor room cover, but it may as well be part of the knee airbag module 10.

Moreover, the outer housing 12 includes a rigid outer housing part 42 which is an inherently stiff component part separate from the remaining components of the outer housing 12 and from the cover 36. The rigid outer housing part 42 is made, for example, from sheet metal or from an appropriate synthetic material.

Figure 2:
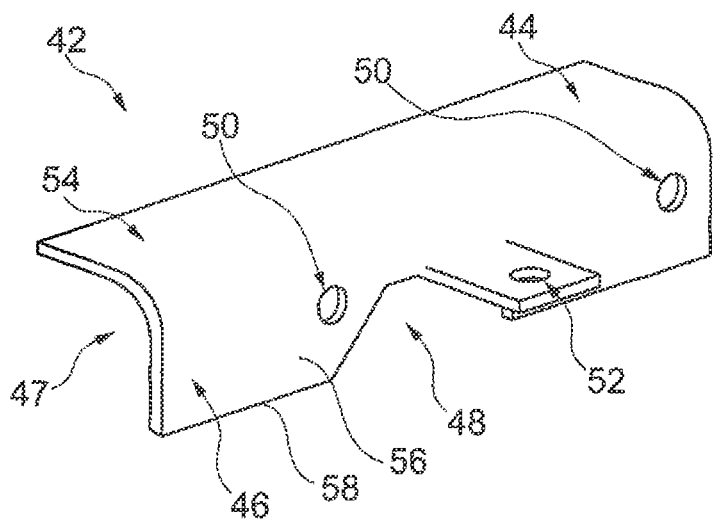
FIG. 2 shows a schematic perspective view of a rigid outer housing part of the knee airbag module from FIG. 1.
Figure 3:
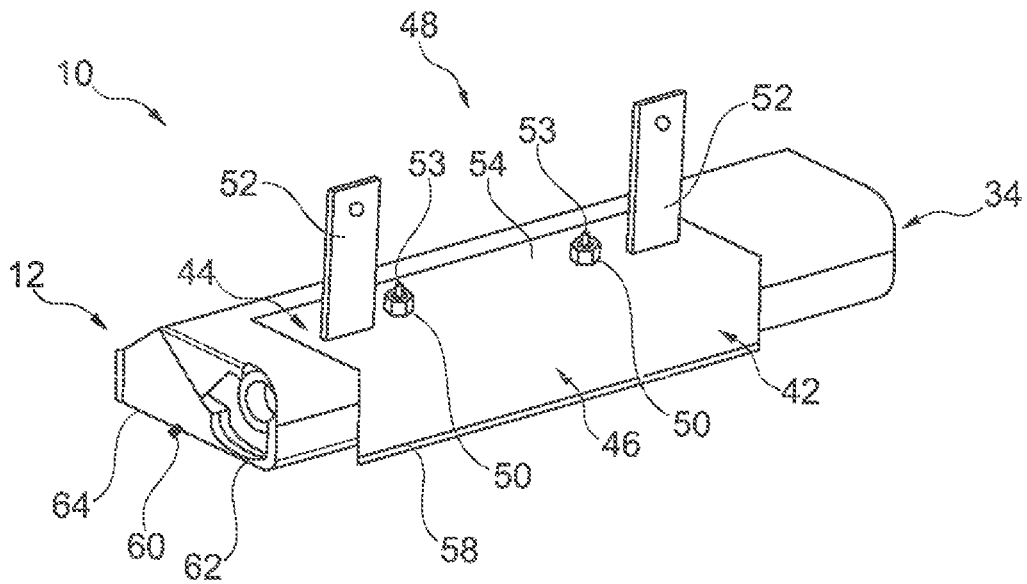
FIG. 3 shows a schematic perspective view of a knee airbag module according to the invention in accordance with a second embodiment.

FIG. 2 illustrates the rigid outer housing part 42 alone and in greater detail.

The rigid outer housing part 42 in this example is a component part bent approximately in L-shape which includes a first leg 44 and a second leg 46 adjacent to the first leg 44 and extending approximately at right angles with the first leg 44. The end faces 47 of the rigid outer housing part 42 are open.

In the second leg 46 a fastening portion 48 is provided which in this case comprises two fastening holes 50 in the second leg 46 as well as rigid tabs 52 projecting from the second leg 46 and having another fastening hole.

As is evident from FIG. 1, through the fastening hole in the tab 52 screwing with a body member (not shown) of the vehicle may be effectuated, whereas fastening bolts 53 of the inflator 32 via which the inflator 32 is tightly fixed to the vehicle are protruding through the fastening holes 50.

The rigid outer housing part 42 is arranged in the knee airbag module 10 such that the first leg 44 covers the airbag package 24 on the rear side 16 of the outer housing 12 partly, in this case about 75% thereof. The portion of the rigid outer housing part 42 covering the airbag package 24 forms a first bearing zone 54 for the deploying airbag 20.

The fastening portion 48 can be easily adapted to different fastening geometries inside the vehicle without the geometry of the first bearing zone 54 having to be modified.

The rigid outer housing part 42 does not enclose the pre-assembled unit of the inflator 32 and the airbag package 24 completely, however, but encloses the same only on one side via the second leg 46 forming part of a sidewall of the outer housing 12 as well as partially on the rear side 16 by the first leg 44.

Hence, at the end faces, at the sidewall opposed to the leg 46 and at parts of the rear side 16 the outer housing 12 is formed exclusively by the flexible airbag wrapping 34. The latter closes off the knee airbag module 10 to the outside in said portions.

In this case, the knee airbag module 10 is limited on the front side 14 by the cover 36.

In the shown example, the rigid outer housing part 42 is located outside the flexible airbag wrapping 34. However, it would also be possible to arrange the rigid outer housing part 42 inside the airbag wrapping 34 or to interrupt the latter in the area of the rigid outer housing part and to fix the edges of the flexible airbag wrapping 34 to the rigid outer housing part 42.

Upon activation of the knee airbag module 10, filling gas provided by the inflator 32 arrives at first in the folded airbag portion 26 which is closest to the inflator 32 and forms an inflating portion which assists ejecting the airbag package 24 from the outer housing 12. In this example, this inflating portion is arranged directly on the rear side 16 of the outer housing 12 and directly below the first bearing zone 54 of the rigid outer housing part 42.

In the embodiment illustrated here, the inflating portion 26 merely consists of one single fold of the airbag 20 and, resp., merely of an area in which the two outer walls of the airbag 20 extend in parallel to each other. When the filling gas flows in, the volume of the inflating portion is increased, which also results in a force in the direction of the rear side 16 of the outer housing 12. At this point, the swelling inflating portion impinges on the first bearing zone 54 provided at the first leg 44 of the rigid outer housing part 42 which serves as counter-bearing and generates a counter-force $F_1$ directed appropriately in the opposite direction perpendicularly to the bearing zone 54 (schematically shown in FIG. 1). In the shown example, the counter-force $F_1$ thus points towards the deployment aperture 18 and is directed approximately perpendicularly to the plane of the deployment aperture 18.

In this way, a defined force component in the direction of the deployment aperture 18 is provided which ensures the cover 36 to be opened at the weakened zones 38 and the flap 40 to be capable of swinging open into the vehicle interior 22 and to release the deployment aperture 18.

The extending inflating portion then pushes the largely still folded airbag package 24 out of the outer housing 12 into the vehicle interior 22 where the filling gas which continues flowing into the airbag 20 successively fills and deploys the other folded portions 28, 30 so that the airbag deploys along the instrument panel (not shown in detail).

Accordingly, the deploying airbag 20 bears against the second leg 46 and especially against the free edge 58 thereof which forms a second bearing zone 56 and applies a counter-force $F_2$ aligning the airbag 20 along the instrument panel 23 (cf. also FIGS. 5 and 6). The free edge 58 and thus the second bearing zone 56 are located below the inflator 32 in the mounting position so that, when the airbag 20 leaves the outer housing 12, it has an area against which it may abut and which may exert the counter-force $F_2$ upon the same.

FIGS. 3 to 6 illustrate a second embodiment of the knee airbag module 10. Since they differ from the first embodiment by details only, the already introduced reference numerals will be continued to be used.

In contrast to the first embodiment, for fastening the knee airbag module 10 to a component 60 fixed to the vehicle (cf. e.g. FIG. 4) the fastening portion 48 in this case includes two tabs 52 projecting from the first leg 44 in each of which a fastening hole is provided via which, just as in the first embodiment, the knee airbag module 10 can be screwed to a component 60 fixed to the vehicle.

Moreover, the fastening portion 48 comprises two fastening holes 50 in the first leg 44 which serve, just as in the first embodiment, for fixing the fastening bolts 53 of the inflator 32. The selection of the respective fastening option ensues from the space offered within the vehicle. This makes no difference for the function of the knee airbag module 10.

In this embodiment, too, the second leg 46 extends in a direction R perpendicularly to the extension of the first leg 44 beyond the inflator 32 so that a free edge 58 of the second leg 46 projects significantly from the outer periphery of the inflator 32. The free edge of the second leg 46 in this case equally forms a second bearing zone 56 against which the airbag 20 bears during and after deployment. The second bearing zone 56 applies a counter-force $F_2$ which ensures the airbag 20 to be positioned independently without the aid of further component parts in its environment into its final position (schematically shown in FIGS. 1, 5 and 6).

The second bearing zone 56 may extend over the entire width of the knee airbag module 10, i.e. over the entire width of the folded airbag 20 or else, as shown here, only over a portion thereof.

Any further rigid housing parts in addition to the rigid outer housing part 42 are not required.

FIGS. 4 to 6 illustrate the deployment of the airbag 20, with FIG. 4 showing the non-activated state of the knee airbag module 10, FIG. 5 showing the state at the beginning of deployment of the airbag 20 in which the folded portion 30 has already left the outer housing 12 in the still folded state, and FIG. 6 showing the airbag 20 in its completely deployed and finally positioned state.

In this embodiment, no rigid cover 36 is provided, but it would also be possible to use such cover 36 or to omit the same in the first embodiment.

The flexible airbag wrapping 34 tears at a weakened zone 60 which extends along the width of the folded airbag 20, i.e. into the image plane of FIGS. 1 and 4. Accordingly, the flexible airbag wrapping 34 is divided into two segments 62, 64 which remain connected to the remaining airbag wrapping 34 and also remain fixed on the vehicle, in this case via the fixation of the fastening bolts 53 of the inflator 32.

The two segments 62, 64 protect the lower end 25 of the instrument panel 23 and, resp., the free edge 58 of the second leg 46 by surrounding the same during deployment of the airbag 20 so that the deploying airbag 20 will not directly contact said structures. This is illustrated in FIGS. 5 and 6. Such configuration would also be possible in the first embodiment.

The invention claimed is:

1. A knee airbag module of a vehicle occupant restraint system, comprising an outer housing (12) having a front side (14) including a deployment aperture (18) and an opposite rear side (16), an airbag (20) and an inflator (32) which provides filling gas for the deployment of the airbag (20), wherein the airbag (20) is folded and in the folded state is retained by a flexible airbag wrapping (34) having no inherent rigidity while forming an airbag package (24), wherein the airbag package (24) constitutes a pre-assembled unit and the flexible airbag wrapping (34) at least in portions closes off the airbag module (10) to the outside, and wherein the outer housing (12) comprises a rigid outer housing part (42) which includes a first bearing zone (54) positioned in the area of the airbag package (24) against which the airbag (20) bears during deployment.

2. The knee airbag module according to claim 1, wherein the first bearing zone (54) is opposed to the deployment aperture (18).

3. The knee airbag module according to claim 2, wherein the first bearing zone (54) forms a portion of a rear side (16) of the outer housing (12) opposed to the deployment aperture (18), wherein, in the area of the rear side (16), the rigid outer housing part (42) closes off the knee airbag module (10) to the outside only in portions.

4. The knee airbag module according to claim 1, wherein the rigid outer housing part (42) is L-shaped in cross-section and a first leg (44) forms at least a part of the rear side (16) of the outer housing (12) and a second leg (46) forms at least a part of a sidewall of the outer housing (12).

5. The knee airbag module according to claim 4, wherein the second leg (46) forms a second bearing zone (56).

6. The knee airbag module according to claim 5, wherein the free edge (58) of the second leg (46) forms the second bearing zone (56).

7. The knee airbag module according to claim 1, wherein the rigid outer housing part (42) forms a maximum of 75% of each of the rear side (16) and of a sidewall of the outer housing (12) of the knee airbag module (10) and the remaining part is formed at least predominantly, preferably completely, by the flexible airbag wrapping (34).

8. The knee airbag module according to claim 1, wherein, in its folded package portion, the airbag package (24) includes an inflating portion (26) which deploys at the beginning of the deployment operation, wherein the inflating portion (26) is arranged adjacent to the bearing zone (54).

9. The knee airbag module according to claim 8, wherein the inflating portion (26) is formed by one single fold of the airbag (20).

10. The knee airbag module according to claim 1, wherein the knee airbag module (10) includes a cover (36) facing a vehicle interior (22) and closing the deployment aperture (18).

11. The knee airbag module according to claim 1, wherein the rigid outer housing part (42) is a separate one-piece component part.

12. The knee airbag module according to claim 1, wherein the flexible airbag wrapping (34) is made especially from fabric material or from a film.

13. The knee airbag module according to claim 1, wherein the flexible airbag wrapping (34) also wraps the inflator (32) so that the latter is part of the pre-assembled unit.

14. The knee airbag module according to claim 1, wherein the rigid outer housing part (42) includes a fastening portion (48) via which the rigid outer housing part (42) can be fixed to the vehicle.

15. A knee airbag module of a vehicle occupant restraint system, comprising an outer housing (12) having a front side (14) including a deployment aperture (18) and an opposite rear side (16) and comprising an airbag (20) and an inflator (32) which provides filling gas for the deployment of the airbag (20), wherein the airbag (20) is folded and in the folded state is retained by a flexible airbag wrapping (34) having no inherent rigidity while forming an airbag package (24), wherein the airbag package (24) constitutes a pre-assembled unit and the flexible airbag wrapping (34) at least in portions closes off the knee airbag module (10) to the outside, and wherein, in the mounting position of the pre-assembled unit, part of the vehicle environment includes a first bearing zone (54) positioned in the area of the airbag package (24) against which the airbag (20) bears during deployment.

16. The knee airbag module according to claim 15, wherein the first bearing zone (54) is opposed to the deployment aperture (18).

17. The knee airbag module according to claim 16, wherein the first bearing zone (54) forms a portion of a rear side (16) of the outer housing (12) opposed to the deployment aperture (18), wherein, in the area of the rear side (16), the rigid outer housing part (42) closes off the knee airbag module (10) to the outside only in portions.

18. The knee airbag module according to claim 15, wherein the rigid outer housing part (42) is L-shaped in cross-section and a first leg (44) forms at least a part of the rear side (16) of the outer housing (12) and a second leg (46) forms at least a part of a sidewall of the outer housing (12).

19. The knee airbag module according to claim 18, wherein the second leg (46) forms a second bearing zone (56).

20. The knee airbag module according to claim 15, wherein, in the mounting position of the pre-assembled unit, a second part of the vehicle environment forms a second bearing zone (56) protruding from the inflator (32) in a direction (R) perpendicularly to the first bearing zone (54).

21. The knee airbag module according to claim 18, wherein the free edge (58) of the second leg (46) forms the second bearing zone (56).

22. The knee airbag module according to claim 15, wherein the rigid outer housing part (42) forms a maximum of 75% of each of the rear side (16) and of a sidewall of the outer housing (12) of the knee airbag module (10) and the remaining part is formed at least predominantly, preferably completely, by the flexible airbag wrapping (34).

23. The knee airbag module according to claim 15, wherein, in its folded package portion, the airbag package (24) includes an inflating portion (26) which deploys at the beginning of the deployment operation, wherein the inflating portion (26) is arranged adjacent to the bearing zone (54).

24. The knee airbag module according to claim 23, wherein the inflating portion (26) is formed by one single fold of the airbag (20).

25. The knee airbag module according to claim 15, wherein the knee airbag module (10) includes a cover (36) facing a vehicle interior (22) and closing the deployment aperture (18).

26. The knee airbag module according to claim 15, wherein the rigid outer housing part (42) is a separate one-piece component part.

27. The knee airbag module according to claim 15, wherein the flexible airbag wrapping (34) is made especially from fabric material or from a film.

28. The knee airbag module according to claim 15, wherein the flexible airbag wrapping (34) also wraps the inflator (32) so that the latter is part of the pre-assembled unit.

29. The knee airbag module according to claim 15, wherein the rigid outer housing part (42) includes a fastening portion (48) via which the rigid outer housing part (42) can be fixed to the vehicle.

* * * * *